United States Patent [19]
Miller

[11] Patent Number: 5,140,304
[45] Date of Patent: * Aug. 18, 1992

[54] SIREN SOUND SYCHRONIZED LIGHT BAR SYSTEM

[76] Inventor: Jack V. Miller, 700 N. Auburn Ave., Sierra Madre, Calif. 91024

[*] Notice: The portion of the term of this patent subsequent to May 16, 2006 has been disclaimed.

[21] Appl. No.: 155,169

[22] Filed: Oct. 11, 1988

Related U.S. Application Data

[63] Continuation-in-part of Ser. No. 854,565, Apr. 22, 1986, Pat. No. 4,831,357.

[51] Int. Cl.$^5$ .................................................. G08B 7/00
[52] U.S. Cl. ..................................... 340/472; 116/147; 340/405
[58] Field of Search ............... 340/472, 405, 326, 331, 340/332, 471, 474, 475, 463, 468, 478; 362/219; 116/147

[56] References Cited

U.S. PATENT DOCUMENTS

| | | | |
|---|---|---|---|
| 3,786,498 | 1/1974 | Lipe et al. | 340/326 |
| 4,040,050 | 8/1977 | Nunn, Jr. | 340/405 |
| 4,232,390 | 11/1980 | McEvilly, Jr. | 455/77 |
| 4,668,938 | 5/1987 | Bosnak | 340/405 |
| 4,831,357 | 5/1989 | Miller | 340/472 |

*Primary Examiner*—Jin F. Ng
*Assistant Examiner*—Brent A. Swarthout

[57] ABSTRACT

A light bar system for a motor vehicle including a plurality of forward-facing lights and a plurality of rear-facing lights transversely spaced on a bar across a motor vehicle, sequentially operating the forward-facing lights in a pattern moving from one light to the next light in a pattern in a preferred direction, and simultaneously operating the rear-facing lights in a pattern moving from one light to the next light in a pattern in the direction opposite that of the forward-facing lights; and sequentially operating the lights with a frequency modulating ramp generator optionally driving an acoustic siren and producing an electrical ramp signal of changing frequency, including a means for selecting a series of time-spaced frequencies in the changing frequency ramp signal, and a means for operating at least one specific forward-facing light and one specific rear-facing light in the light bar at each selected frequency of the ramp signal.

A preferred embodiment includes a joy-stick light control switch having a detented central "OFF" position in which the lights are inoperative, and four detented orthogonal positions including "PURSUIT", "TAKE-DOWN", "REAR ONLY" and "PARK" positions selecting programmed light patterns; and a siren control joy-stick switch having a detented "OFF" position, wherein the siren is silent, and four detented orthogonal positions including "SIREN", "P.A.", a "HORN" and "RADIO" positions selecting programmed audio signal functions.

18 Claims, 2 Drawing Sheets

PROGRAMMED LIGHT PATTERN

| MODE | RAMP FREQUENCY Hz | | | | | | | | | |
|---|---|---|---|---|---|---|---|---|---|---|
| | 100 | 200 | 300 | 400 | 500 | 600 | 700 | 800 | 900 | 1000 |
| PURSUIT | F4,F5 R4,R5 | F4,F5 R4,R5 | F3,F6 R3,R6 | F3,F6 R3,R6 | F2,F7 R2,R7 | F2,F7 R2,R7 | F1,F8 R1,R8 | F1,F8 R1,R8 | TR,TL AR,AL | TR,TL AR,AL |
| PURSUIT PULL-TO-RIGHT | TL | F1 R8 | F2 R7 | F3 R6 | F4 R5 | F5 R4 | F6 R3 | F7 R2 | F8 R1 | TR |
| PURSUIT PULL-TO-LEFT | TR | F8 R1 | F7 R2 | F6 R3 | F5 R4 | F4 R5 | F3 R6 | F2 R7 | F1 R8 | TL |
| TAKE-DOWN | F1,TL,TR R4,R5 | F1,TL,TR R4,R5 | F1,TL,TR R4,R5 | F1,TL,TR R3,R6 | F1,TL,TR R3,R6 | F1,TL,TR R2,R7 | F1,TL,TR R2,R7 | F1,TL,TR R1,R8 | F1,TL,TR R1,R8 | F1,TL,TR R1,R8 |
| TAKE-DOWN RIGHT | F1,TR R8 | F1,TR R8 | F1,TR R7 | F1,TR R6 | F1,TR R5 | F1,TR R4 | F1,TR R3 | F1,TR R2 | F1,TR R1 | F1,TR R1 |
| TAKE-DOWN LEFT | F1,TL R1 | F1,TL R1 | F1,TL R2 | F1,TL R3 | F1,TL R4 | F1,TL R5 | F1,TL R6 | F1,TL R7 | F1,TL R8 | F1,TL R8 |
| PARK | F1 | F1 R1 | F1 | F1 R1 | F1 | F1 R1 | F1 | F1 R1 | F1 | F1 R1 |
| REAR ONLY | R4,R5 | R4,R5 | | R4,R5 | | R4,R5 | | R4,R5 | | R4,R5 | fig. 2

SIREN SOUND SYCHRONIZED LIGHT BAR SYSTEM

This is a continuation-in-part of Ser. No. 854,565, filed Apr. 22, 1986, now U.S. Pat. No. 4,831,357.

BACKGROUND OF THE INVENTION

The present invention relates to light bars for emergency vehicles, such as police cars, ambulances and fire trucks. Presently known light bars employ various combinations of fixed lights, rotating lights or rotating reflectors, to produce flashing light images to attract the attention of motorists on the highway. They also include one or more sirens to warn the motorist of the approaching emergency vehicle.

These electromechanical devices involve drive motors, slip rings, gears, bearings and ladder chains; all of which have limited life and present some severe field reliability problems, particularly in very high or low temperatures. In addition the motor brushes and slip rings produce arcing in normal operation that must be filtered out of any radio signals.

The single function of the light bar is to communicate some form of command to the motorist. This is of critical importance in terms of both public safety and officer safety. Present light bars simply display a jumble of flashing lights of very short flash duration. The motorist often does not even see an emergency vehicle immediately behind him, and it is commonplace for a police car to follow a motorist for miles with the light bar and siren on, only to have the motorist say he did not notice the police car at all. In a well sound-proofed car, with curved and tinted windows rolled up and a stereo playing, it is often a true statement.

If and when a motorist does see the lights of an emergency vehicle behind him he has no idea of what he is supposed to do. If he is driving in one of the center lanes of a freeway, he doesn't know whether to pull over to the left or right shoulder, or stop right there.

If the motorist sees a light bar operating ahead, he also doesn't know whether to stop, pass on the right, or pass on the left. A much feared occurance is when the decision is made too late, and the motorist simply plows into the emergency vehicle or other vehicles in an accident.

Prior art light bar controls are fairly complex, and have little logical correlation between the manipulation of the controls, the operation desired of the light bar system, or the operational functions being performed. It takes an experienced operator that is familiar with the controls of a specific system to work the controls without looking at them. This can be very hazardous in terms of both public safety and operator safety. The operator often has to initiate or change light bar operation under extreme duress of conditions involving high speed driving, radio reception and transmission, keeping track of and reporting location and direction, driving in adverse weather, and watching both suspects and bystanders. Glancing down at the light bar control for a fraction of a second can be hazardous or fatal to the operator and others.

Prior art light bar controls also leave many operational decisions up to the individual in the emergency vehicle, and he therefore decides on the spur of the moment what mode of light and siren operation to use in pursuit, moving through freeway or highway traffic, crossing intersections, pulling over a suspect, over taking a vehicle, controlling traffic, stopping a vehicle, etc. This practically eliminates standardization of operational procedures, making training more difficult, and increasing potential liability for the operator's employer.

SUMMARY OF THE INVENTION

A primary purpose of the present invention is to provide a light bar with improved visibility, and greater attention-gaining power. It is another purpose of the invention to provide a light bar having the ability to direct the observing motorist to take some specific action. It is another purpose of the invention to provide a light bar having optional modes of traffic directing operation in which the mode selection is pre-programmed in accordance with department policies by an internal computer. It is another purpose of the present invention to provide a light bar in which the visual pattern of the lights is made more evident by synchonizing the lights with the sound of a siren. It is another purpose of the present invention to provide a light bar having a control with simple, logical and tactile operation that is closely correlated with the functions of the light bar system and consistent with standardized department operating procedures for emergency vehicles, and in which the controls are integrated with normal vehicle functions, such as the horn and turn signal indicators.

The achievement of the foregoing purposes of the invention is accomplished by providing a light bar system for an emergency vehicle having a fixed row of forward-facing lights and a fixed row of rear-facing lights arranged across the width of a light bar mountable on the vehicle. The forward-facing lights are operated in a pattern moving from one light to the next in a preferred direction, and the rear-facing lights are operated in a pattern moving from one light to the next in the direction opposite that of the forward-facing lights.

The light patterns are driven by a frequency modulated ramp generator, optionally driving an acoustic siren, and producing an electrical ramp signal of changing frequency. Specific lights in the light bar are energized in a sequence through selecting a series of time-spaced frequency bands in the changing frequency ramp signal, and operating at least one specific forward-facing light and one specific rear-facing light in the light bar at each selected frequency of the ramp signal.

In this arrangement the ramp generator drives the siren, and the light patterns of the light bar move in synchronism with the sound of the siren. Therefore the motorist has his visual image reinforced with a simultaneous audio image, increasing his sensitivity of perception by combining two senses.

In addition, the perceived visual pattern gives the motorist some communicated instruction and conveys a number of unambiguous commands to the motorist. The specific commands are selected by operation of a pair of joy-stick switches, one for light control and one for siren control, with the joy-stick commands modified by the operation of other vehicle controls, such as the horn and turn signal indicators.

A prefered embodiment provides for the selection of siren modes and visual patterns to be made in accordance with department policy, by the programming of a computer control in the form of a light selection programmer, whereby the department can determine the use of siren wail or yelp modes, and can establish the light bar sequences best suiting traffic conditions for their jurisdiction.

BRIEF DESCRIPTION OF THE DRAWINGS

FIG. 2 is a programmed light pattern for the operating modes of the light bar system of FIG. 1.

DETAILED DESCRIPTION OF THE DRAWINGS

Figure 1:
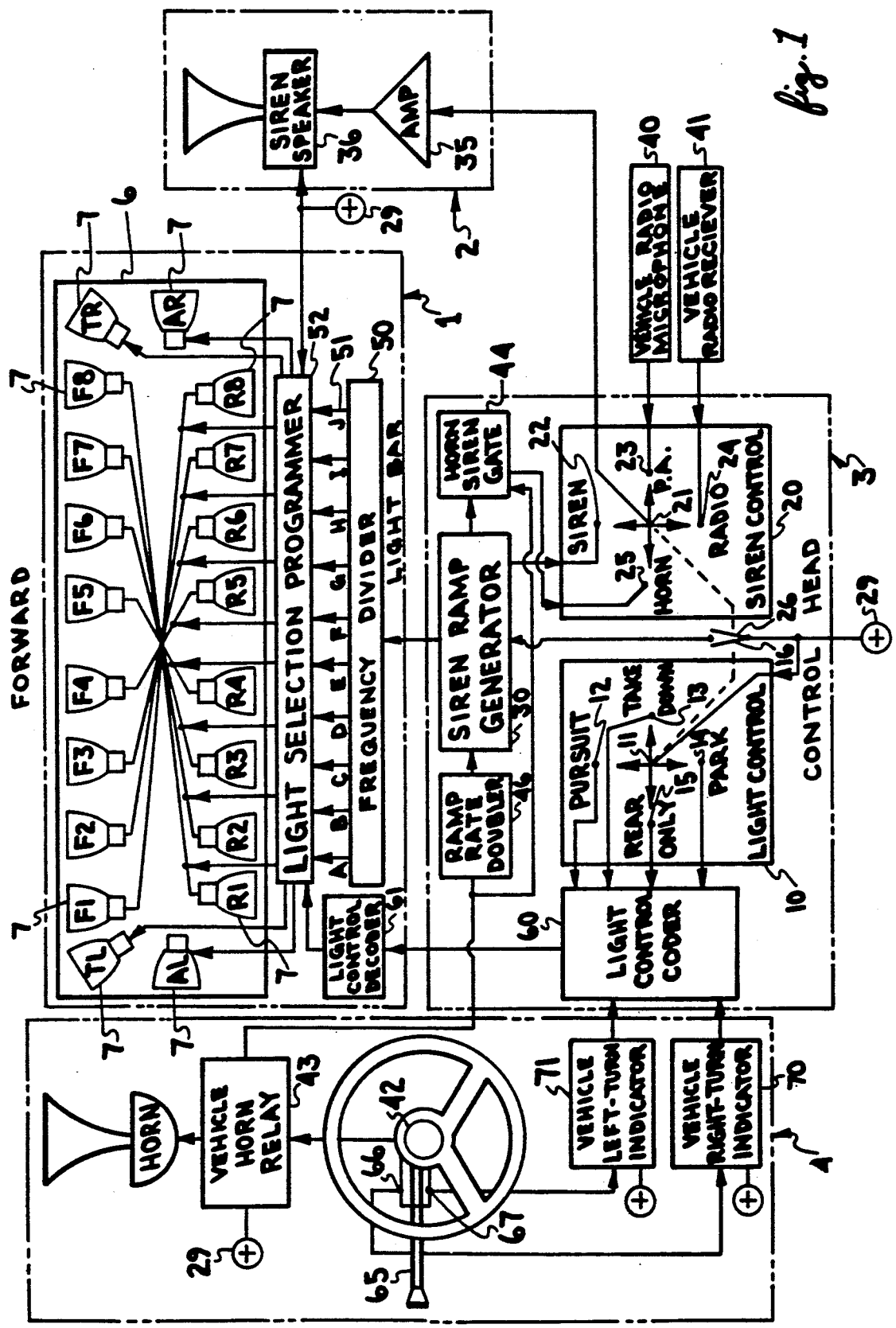
FIG. 1 is a functional schematic block diagram of a light bar system according to the invention.

In FIG. 1 a light bar 1 is shown connected to a siren 2, a control head 3 and a motor vehicle 4. Light bar 1 is provided with an elongated structural bar 6 mounted perpendicular to the length of motor vehicle 4, and supporting a plurality of lights 7, including a row of spaced forward-facing red, blue or amber lights F1, F2, F3, F4, F5, F6, F7 and F8; and additionally supporting a row of spaced rear-facing red, blue or amber lights R1, R2, R3, R4, R5, R6, R7, and R8. At the left-hand end of the structural bar is a left-oblique-facing lefthand clear take-down light TL, and a left-facing clear alley light AL. At the right-hand end of the structural bar is a right-oblique-facing take-down clear light TR, and a right-facing clear alley light AR.

Control head 3 is provided with a light control joystick switch 10 having a centrally detented off position 11 and four detented orthogonal on positions; "PURSUIT" position 12, "TAKE-DOWN" position 13, "PARK" position 14, and "REAR ONLY" position 15. Control head 3 is also provided with a siren control joy-stick switch 20 having a centrally detented off position 21 and four detented orthogonal on positions; "SIREN" position 22, "P.A." position 23, "RADIO" position 24 and "HORN" position 25. Operation of light control switch 10 also closes switch 16 and/or operation of siren control switch 20 closes switch 26, supplying vehicle power 29 to a siren ramp generator 30, which produces a repeating audio frequency pattern of continuously variable frequency typically in the range from 20 Hz to 2000 Hz. in the form of either an increasing, then decreasing wail mode, or a repeating increasing saw-tooth frequency modulation yelp mode.

The siren ramp generator 30 supplies the siren signal to the "SIREN" contact 22 and placing the siren control 20 in the "SIREN" position connects siren ramp generator 30 to a siren amplifier 35, which modulates vehicle power 29 to a siren speaker 36. Placing siren control 20 in the "P.A." position 23 connects the vehicle radio microphone 40 to the siren amplifier 35, permitting the officer to utilize the siren speaker 36 as a public address system. Placing the siren control 20 in the "RADIO" position 24 connects the siren amplifier 35 to the vehicle radio receiver 41, permitting the operator to utilize the siren speaker 36 to produce the audio of incoming radio transmissions. Placing the siren control 20 in the "HORN" position 25 connects the siren amplifier 35 to a horn siren gate 44, which is connected in turn to siren ramp generator 30; permitting the operator to momentarily operate the siren by pressing the vehicle horn button 42, closing the vehicle horn relay 43 and operating the siren concurrently with the vehicle horn 45.

A ramp rate doubler 46 is connected between the vehicle horn relay 43 and the siren ramp generator 30. Ramp rate doubler 46 commands siren ramp generator 30 to produce double the number of wail or yelp patterns per unit of time as long as the vehicle horn button 42 is depressed. This function provides a visual and audio pattern change for traversing intersections or other local hazardous locations.

The siren ramp generator 30 also supplies a siren signal to a frequency divider 50 which divides the frequency spectrum into a number of bands 51a through 51j, with each band connected to a respective input to a light selection programmer 52, selectably connecting each of frequency bands 51 to one or more lights 7. Selection of the light pattern at each band of the frequency spectrum is made by operation of the light control 10. Placing the light control switch 10 in the central off position 11 makes the light bar inoperative. Moving the control 10 to any of the orthogonal mode positions closes a light enable switch 16 to energize the siren ramp generator 30.

Placing control 10 in the "PURSUIT" position 12 selects a code pattern in the light control coder 60, which provides a command to a light control decoder 61 which selects a light pattern program in the light selection programmer 52 by any of a number of conventional means, such as ring counters, stepping switches or and-gates whereby any light 7 may be programmed to operate at any selected frequency band 51 for each light control 10 operating mode 12, 13, 14 or 15.

A typical pursuit pattern programmable is a "handclap" mode in which the light pattern moves from the center of the light bar to the ends and back to the center. Since the light selection programmer 52 is driven by the siren ramp generator 30 through the frequency divider 50, the light pattern is synchronized with the siren ramp generator frequency spectrum, whereby typically the center lights F4, F5, R4 and R5 are on at a low siren frequency band; F3, F6, R3 and R6 are on at the next higher frequency band; F2, F7, R2 and R7 are on at yet the next higher frequency band; F1, F8, R1 and R8 are on at still the next higher frequency band; and TL, TR, AL and AR are on at the highest frequency band. This mode provides a visual command sweeping the light pattern from the center to the sides, instructing vehicles both in front and to the rear to move aside in either direction.

Another optional pursuit pattern that is programmable is a bi-directional sweep pattern in which either the forward-facing or rear-facing lights sweep back and forth from one end of the light bar 1 to the other end.

Since the motion of the light pattern is synchronous with the siren ramp generator 30, placement of the siren control 20 in the siren position 22 energizes the siren speaker 36 through the siren amplifier 35. Therefore the motion of the light pattern is also synchronous with the siren audio, providing both visual and audible stimuli to observers, and improving the threshold of recognition of the emergency vehicle.

If a police car moving through traffic in the pursuit mode comes up behind a suspect the officer wishes to pull over to the left, the officer places the police vehicle's turn signal control 65 in the left turn position 66. This energizes the vehicle's left-turn indicator 71, giving a command to the light control coder 60, and the light control decoder 61 to select an operating mode in the light selection programmer 52. A typical programmed pattern would then sequence the forward-facing lights in a pattern wherein light TR is on at the lowest siren frequency band, lights F8 through F1 are sequenced on at successively higher bands, and TL is on at the highest frequency band. The suspect would then observe a sweeping pattern from right to left, commanding him to pull over to his left. At the same time the rear-facing lights are sequenced in the opposite direction, with light AL on at the lowest frequency band, R1 through R8 are sequenced on at successively higher bands, and AR is on at the highest frequency band. Overtaking motorists would then be instructed by the light pattern to pass to the right of the police car.

Similarly, if a police car moving through traffic in the pursuit mode comes up behind a suspect the officer wishes to pull over to the right, the officer places the police vehicle's turn signal control 65 in the right turn position 66. This energizes the vehicle right-turn indicator 70, giving a command to the light control coder 60, through the light control decoder 61 to select an operating mode in the light selection programmer 52. A typical programmed pattern would then sequence the forward-facing lights in a pattern wherein light TL is on at the lowest siren frequency band, lights F1 through F8 are sequenced on at successively higher bands, and TR is on at the highest frequency band. The suspect would then observe a sweeping pattern from left to right, commanding him to pull over to his right. At the same time the rear-facing lights are sequenced in the opposite direction, with light AR on at the lowest frequency band, R8 through R1 are sequenced on at successively higher bands, and AL is on at the highest frequency band. Overtaking motorists would then be instructed to pass to the left of the police car.

Once the officer has pulled the suspect vehicle over to the right, the officer may move the light control switch 10 to the "TAKE-DOWN" position 13. Typical programming for this mode would maintain the rear-facing lights in the left-hand sweep, with the vehicle's turn signal control 65 in the right turn mode to maintain the pass-on-the-left mode described above, would turn on a steady forward-facing light F1, and turn on the right-hand take-down light TR to illuminate the suspect vehicle.

If the officer has pulled the suspect vehicle over to the left, using the "PURSUIT" position 12 the officer may move the light control switch 10 to the "TAKE-DOWN" position 13. Typical programming for this mode with the vehicle's turn signal control 65 in the left turn mode would maintain the rear-facing lights in the right-hand sweep, pass-on-the-right mode, would turn on a steady forward-facing light F1, and turn on the left-hand take-down light TL to illuminate the suspect vehicle.

Operation of the light control switch 10 in the "TAKE-DOWN" position 13 with the turn signal control 65 neutralized may be programmed to operate both take-down lights TR and TL, and may also include both alley lights AR and AL to illuminate a wide area, with the forward and rear facing lights 7 in any mode programmed to conform to department policy.

Light control 10 is also provided with a "PARK" position 14, which operates the light selection programmer through the light control coder 60 and decoder 61, to operate the light bar in a power-conserving mode. This usually operates only one steady forward-facing light, such as F1, and one rear-facing blinking light, such as R1. The number of lights may be anything programmed by department policy for a mode in which the vehicle may be operating for extended time with the engine off or at idle.

An additional position of light control 10 is the "REAR-ONLY" mode. This mode is programmed to omit all forward facing lights 7 in the light bar, but operate any desired pattern programmed by light selection programmer 52 for the rear-facing lights R1 through R8. This is a needed mode for moving through freeway traffic without the hazards of having a number of motorists attempting to change lanes to get out of the way.

In FIG. 2 a program matrix is shown in which the operation of all lights 7 is shown for each frequency band 51 for the light bar modes 12, 13, 14 and 15; and turn signal contacts 66 and 67. This matrix is only typical, and each specific function is programmable to conform to an individual department policy.

The foregoing describes a siren and light bar that achieves the purposes of the invention by providing a system in which the lights and siren provide mutually-reinforcing stimuli to improve perception of observers. The system according to the invention has simple, logical, functionally correlated controls that may be operated without looking at them, to keep the driver's head up during driving. The system communicates specific commands to surrounding traffic, which increases both the safety and utility of operation. The system also permits the functional modes of the light bar and siren to be programmed in accordance with department policies instead of requiring officers to make safety decisions under field conditions. The result is that the present invention creates an integrated system that improves effectiveness and safety in the operation of all emergency vehicles, including police, fire and road maintenance vehicles.

I claim:

1. A light bar for a motor vehicle including:
   a plurality of forward-facing lights and a plurality of rear-facing lights arranged in a light bar having a right-hand end, a center and a left-hand end on a line perpendicular to the length of the vehicle;
   a frequency-modulating siren ramp generator producing an electrical ramp signal of linearly changing audio frequency between a high and low acoustic pitch;
   a frequency divider for selecting a series of time-spaced frequency bands in the changing frequency ramp signal;
   a light selection programmer sequentially operating the lights in any one of a plurality of programmed modes in which at least one specific light is operated in the light bar at each selected frequency band of the frequency divider;
   a light control switch having a plurality of mode positions that select the respective programmed modes of the light selection programmer;
   an acoustic speaker siren driven by the frequency modulating ramp generator; and
   a siren control switch having a plurality of mode positions that select operating modes for the acoustic speaker siren.

2. A light bar system according to claim 1 in which the ramp signal is a generally linear bidirectional undulation pattern also operating the siren in a wail mode of successive increasing and decreasing frequencies.

3. A light bar system according to claim 1 in which the ramp signal is a saw-tooth pattern of linearly increasing frequencies from a low audio frequency to a high audio frequency, also driving the siren in a yelp mode of repeated successive frequency modulating ramps of increasing frequencies.

4. A light bar system according to claim 1 in which the light control switch is a joy-stick switch having a detented central "OFF" position, in which the lights are inoperative, and four detented orthogonal positions including a "PURSUIT" position, a "TAKE-DOWN" position, a "REAR ONLY" position and a "PARK" position.

5. A light bar system according to claim 4 in which the "PURSUIT" position selects a mode in the light selection programmer which is programmed to sequence the forward-facing and rear-facing lights in a pattern in synchronism with the siren in which the lowest selected frequency of the ramp generator operates the two forward-facing lights and the two rear-facing lights nearest the center of the light bar, each successive higher frequency operating the next adjacent light in each direction from the center lights, and the highest frequency operating the light at each end of the light bar; whereby the ramp signal results in an illumination pattern that sequentially switches symmetrically between the center and both ends of the light bar in synchronism with the siren; wherein a siren wail signal sequentially switches the illumination pattern from the center of the light bar to both ends with the increasing siren frequency and then back to the center with the decreasing siren frequency, and a yelp signal sequentially switches the illumination pattern from the center of the light bar to both ends with increasing siren frequency and then begins again at the center at the lower frequency of the yelp signal.

6. A light bar system according to claim 4 in which the "TAKE DOWN" position selects a mode in the light selection programmer which is programmed to sequence the forward-facing and rear-facing lights in a pattern in synchronism with the siren ramp generator in which the forward-facing lights and rear-facing lights in the light bar are sequentially operated by switching in a pattern in which the lowest selected frequency of the frequency modulating ramp generator operates a light at one end of the light bar, each successive higher frequency band operates the next sequential light in the pattern across the light bar, and the highest frequency band operates the light at the opposite end of the light bar; and a wail mode ramp signal produces an illumination pattern that sequentially switches back and forth between the opposite ends of the light bar sychronously with the siren ramp generator wail signal.

7. A light bar system according to claim 4 in which the "REAR ONLY" position selects a mode in the light selection programmer which is programmed to sequence the rear-facing lights only.

8. A light bar system according to claim 4 in which the "PARK" position selects a mode in the light selection programmer which is programmed to sequence only a portion of the forward-facing and rear-facing lights in a pattern in synchronism with the siren ramp generator in which the forward-facing lights and rear-facing lights in the light bar are sequentially operated by switching in a pattern in which the lowest selected frequency of the frequency modulating ramp generator operates a light at one end of the light bar, each successive higher frequency band operates the next sequential light in the pattern across the light bar, and the highest frequency band operates the light at the opposite end of the light bar; and a wail mode ramp signal produces an illumination pattern that sequentially switches back and forth between the opposite ends of the light bar synchronously with the siren ramp generator wail signal.

9. A light bar system according to claim 6 or 8 which includes an electrical switching means operable by the left-turn signal selector of the motor vehicle to operate a sequentially operated illumination pattern in which the forward-facing lights sequentially switch from the right-hand end of the light bar to the left-hand end, and the rear-facing lights sequentially switch from the left-hand end of the light bar to the right-hand end; and operable by the right-turn signal selector of the motor vehicle in which the forward-facing lights sequentially switch from the left-hand end of the light bar to the right-hand end and the rear-facing lights sequentially switch from the right-hand end of the light bar to the left-hand end.

10. A light bar system according to claim 9 in which the left-turn signal actuated light pattern also includes a continuously operating uncolored spotlight aimed in the left-oblique direction, and the right-turn signal actuated light pattern also includes a continuously operating uncolored spotlight aimed in the right-oblique direction.

11. A light bar system according to claim 2 or 3 in which the ramp signal is provided with an electric switch means operable by the horn button of the motor vehicle and also includes a means for doubling the number of ramps generated per unit of time.

12. A light bar system according to claim 1 in which the siren control switch is a joy-stick switch having a detented central "OFF" position, wherein the siren is silent, and four detented orthogonal positions including a "SIREN" position, a "P.A." position, a "HORN" position and a "RADIO" position.

13. A light bar system according to claim 12 in which the "SIREN" position selects a mode in which the siren ramp generator drives the acoustic speaker siren.

14. A light bar system according to claim 12 in which the "P.A." position selects a mode in which the acoustic speaker siren is connected to a radio microphone.

15. A light bar system according to claim 12 in which the "HORN" position selects a mode in which the acoustic speaker siren is connected to the siren ramp generator through a switching means connected to a horn relay of the motor vehicle, whereby operating the vehicle horn energizes the siren.

16. A light bar system according to claim 12 in which the "RADIO" position selects a mode in which the acoustic speaker siren is connected to a radio receiver of the motor vehicle, whereby incoming radio signals can be heard over the acoustic speaker siren.

17. A light bar system according to claim 4 in which the orthagonal position for the "PURSUIT" mode is towards the front of the vehicle, the "TAKE DOWN" mode is towards the right of the vehicle, the "REAR ONLY" mode is towards the left of the vehicle, and the "PARK" mode is towards the rear of the vehicle.

18. A light bar according to claim 12 in which the orthagonal position for the "SIREN" mode is towards the front of the vehicle, the "P.A." mode is towards the right of the vehicle, the "HORN" mode is towards the left of the vehicle, and the "RADIO" mode is towards the rear of the vehicle.

* * * * *